United States Patent [19]

Hornung

[11] Patent Number: 4,794,515
[45] Date of Patent: Dec. 27, 1988

[54] PROTECTION OF DATA IN A MULTIPROGRAMMING DATA PROCESSING SYSTEM

[75] Inventor: Louis M. Hornung, Austin, Tex.

[73] Assignee: International Business Machines Corporation, Armonk, N.Y.

[21] Appl. No.: 820,462

[22] Filed: Jan. 17, 1986

[51] Int. Cl.[4] .................................................. G06F 9/00
[52] U.S. Cl. ...................................................... 364/200
[58] Field of Search ... 364/200 MS File, 900 MS File

[56] References Cited

U.S. PATENT DOCUMENTS

| | | | |
|---|---|---|---|
| 4,096,564 | 6/1978 | Inose et al. | 364/200 |
| 4,177,510 | 12/1979 | Appell et al. | 364/200 |
| 4,262,332 | 4/1981 | Bass et al. | 364/200 |
| 4,524,415 | 6/1985 | Mills, Jr. et al. | 364/200 |
| 4,654,786 | 3/1987 | Cochran et al. | 364/200 |

Primary Examiner—Raulfe B. Zache
Assistant Examiner—Robert D. Anderson
Attorney, Agent, or Firm—Walter J. Madden, Jr.; Alan H. MacPherson; John L. Jackson

[57] ABSTRACT

A data processing system operates in a multiprogramming mode in which a plurality of different tasks are performed, at least one of the tasks being interruptable by another one of the tasks, and the system includes at least one facility which is not used by all of the tasks. The method of operating the system includes the steps of permitting access to the facility by a first task requesting such access, detecting the interruption by a second task of the first task prior to completion of the first task's use of the facility, and preventing access to the facility by any task until the data and state information in the facility relative to the first task has been stored outside the facility.

9 Claims, 4 Drawing Sheets

PROTECTION OF DATA IN A MULTIPROGRAMMING DATA PROCESSING SYSTEM

CROSS-REFERENCE TO RELATED APPLICATIONS

Co-pending application Ser. No. 561,613, now U.S. Pat. No. 4,604,694, filed Dec. 14, 1983, assigned to the same assignee as the present application, discloses a method for controlling access in a multitasking environment where resources are shared among different tasks. A lockword is established having two parts, a lock flag indicating the status of the resource, whether available, under shared ownership or under exclusive ownership, and a lock printer pointing to the most recently inqueued task. In requesting or releasing access, an initial guess is made as to the value of the lockword and a projected lockword is calculated based on the guess. Then an atomic reference is made to the lockword during which no other multiprocessor has access to the lockword. During the atomic reference, the lockword is compared to the guess of the lockword and if the guess is correct, the lockword is replaced by the projected lockword which rearranges the queue for the requesting or releasing task. If the guess was incorrect, the value of the lockword is used to calculate another projected lockword. If another task can affect the next tasks to gain access, the process with the atomic reference is repeated until no intervening changes occur between atomic references.

BACKGROUND

1. Field of the Invention

This invention relates to data processing systems running in a multiprogramming mode in which the system switches from one task to another and in which it is necessary to protect data from one task when a switch is made to a new task.

2. Prior Art

In many data processing systems there are often system facilities which are not used by all tasks and/or applications which are running on the system. Also, there may be data, status and control information which is stored within the facility. Whenever a switch is made from one task to another, as in a multiprogramming data processing system, it is necessary to switch from the active data which is associated with the old task to that data associated with the new task. In conventional systems, this might be accomplished through the Program Status Word (PSW), or as an extension of the PSW. It might be accomplished through hardware by saving the values stored in hardware registers by writing those values into a Program Status Save (PSS) area of memory, then reading the values associated with the new task and transferring those new values into the hardware registers. In other implementations, there may be multiple sets of hardware registers, with the various sets being associated with the various tasks. Under these circumstances, the task switch is made by switching the pointers which determine the active register set from the set associated with the old task to those associated with the new task. In still other implementations, the exchange of the data may be accomplished through a control program.

Generally, the exchange of data would be between the hardware registers and a PSS area of main memory. Whenever a program status save area is used, more advanced systems would use protection keys to prevent errors in the new task from inadvertently altering the data associated with another task.

When a switch is made to a task which does not use the facility, it is not necessary to switch the data which is active within the facility. The new task has no data to store within the facility; it has no operations to initiate; it need not be cognizant that the facility even exists. The old data can remain active within the facility and can await return of control to the old task. However, the data associated with the old task is exposed to programming errors in the new task. The present invention deals with the protection of the data under these circumstances.

Conventional means of protecting the data are as follows:

1. Perform the program status swap even though it is otherwise unnecessary, to allow the protection mechanisms associated with the program status to protect the facility.

2. Provide checks in the compilers and/or assemblers to screen out all instructions which might address the facility whenever nonusing programs are compiled/assembled.

3. Allow the facility to be accessed only through a control program (perhaps by requiring the machine to be in privileged mode), which screens all accesses in real time and produces program checks whenever a nonusing program inadvertently makes reference to the facility through programming error.

Each of the three solutions described above has disadvantages. The first increases the latency time for task switching if a program status save area in main memory is used. It also increases the size of the status save area, which can be a significant problem if the facility is optional, as may be true for a floating point accelerator facility, for example. If the technique of multiple register sets is used, the increase in latency is minimal, but a set of registers would be wasted for the nonusing tasks. The second alternative has the problem of requiring notifying, controlling, and enforcing all the compiler and assembler writers. This is a particular problem for a machine having an open architecture, such as the IBM PC, where third party programming organizations may write compilers and assemblers for their own direct marketing. The third alternative results in performance degradation at run time; for devices in which performance is critical, this latter alternative would be very detrimental.

SUMMARY OF THE INVENTION

The present invention provides a fourth alternative to those described above by providing a lock mechanism within the facility. The present invention provides a simple yet effective means of protecting data associated with an old task whenever a task switch is made to a new task which has no need to use the facility. The facility can be locked or unlocked only by the control program when it is in privileged mode of operation. When the facility is locked, all problem mode instructions which are used to operate and control the facility are rejected.

DESCRIPTION OF THE PREFERRED EMBODIMENT

Figure 1:
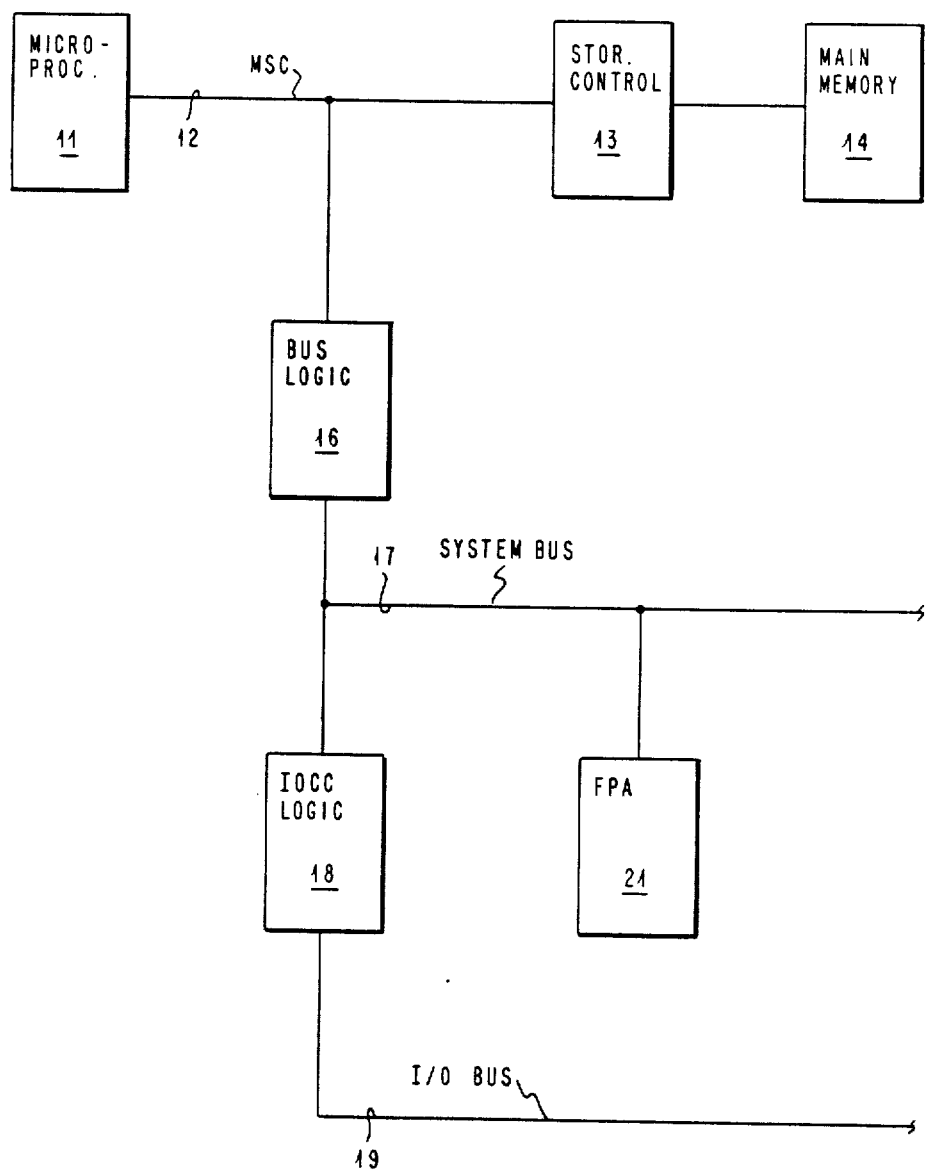
FIG. 1 is a block diagram of a data processing system in which the present invention may be employed.

FIG. 1 illustrates in block diagram form a typical data processing system in which the present invention may be employed. The system includes a microprocessor 11 having a microprocessor storage channel 12. Channel 12 connects to a storage control element 13. Storage control element 13 in turn is connected to main memory 14. Storage channel 12 also connects through bus control logic 16 to a system bus 17 and to input/output channel converter (IOCC) logic 18. Element 18 is connected to an I/O bus 19.

System bus 17 has connected thereto a floating point accelerator (FPA) 21. FPA 21 is the type of resource which is not used by all tasks performed by the system. However, if the FPA is being used by a task, say, task A, which is interrupted, it is important that the parameters, such as operands and states, in the FPA unit for that task not be lost. However, if the interrupting task, task B, does not require access to the FPA unit, it is inefficient to perform the program status swap operation described above in connection with the prior art.

The present invention is directed to solving this problem by detecting when access to FPA unit 21 is requested by task B when the FPA contains information from interrupted task A. The invention also prevents access to the FPA, except for privileged tasks, after the FPA has been "locked" upon interruption of an uncompleted FPA task.

Figure 2:
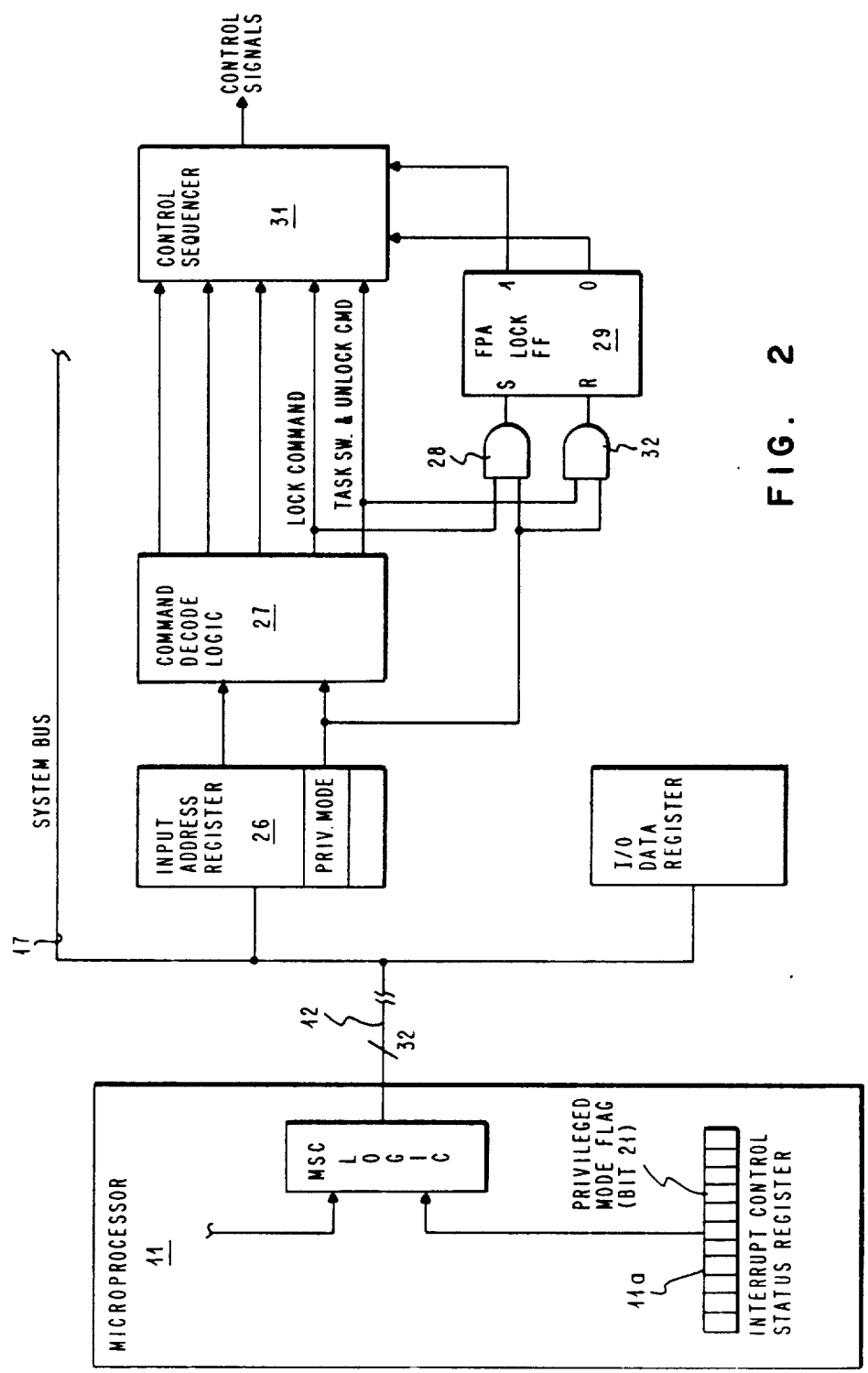
FIG. 2 illustrates one embodiment of the invention applied to the protection of information in the floating point accelerator of FIG. 1.

The operation of one embodiment of the invention is illustrated in FIG. 2. Assume that nonprivileged task A accesses the FPA unit 21. Under these circumstances, the privileged mode flag in the interrupt control status register 11a of microprocessor 11 is set to zero, indicating a nonprivileged task. If task B interrupts task A prior to completion of task A in the FPA unit, the system control program goes to a privileged mode to set the privileged mode flag in register 11a. This privilege mode flag is transmitted to the privilege mode portion of an interrupt address register 26 for the FPA unit. This privilege mode flag in system 26, together with the interrupt command, are transmitted through command decode logic 27 and an AND gate 28 to issue a lock command to the FPA lock flip flop 29. The lock output from flip flop 9 is supplied to a control sequencer 31 which controls access to the FPA unit.

If the nonprivileged interrupting task B does not require access to FPA unit 21, the lock command will remain in effect and the status of task A in the FPA unit will be preserved. However, if interrupting task B does require access to the FPA unit, it encounters the lock, which generates a program check. The control program then issues a privileged command which, through command decode logic 27 and an AND gate 32, is effective to unlock the FPA and cause the contents of task A's information in the FPA to be transferred to the program status save area (usually in main memory). If task B is just beginning, it is then permitted access to the FPA in the usual fashion. However, if task B had been previously interrupted during an FPA operation, it will be necessary to obtain task B's data and state information from the program status save area to resume execution of task B.

Thus, the system operates in a fashion such that if the FPA is unlocked, both privileged and nonprivileged commands can gain access to the FPA. However, if the FPA is locked, only privileged commands can gain access to it. In effect, the input address register 26 is the command register for the FPA because of the presence in register 26 of the FPA commands from microprocessor 11. When the system returns to continue execution of interrupted task A, the stored information from the status save area for task A is returned to the FPA facility and the execution of task A is resumed.

The advantages of the invention are:

1. Data protection and status/state of the facility is completely achieved;
2. The task switching latency is minimal;
3. The program status save area is not made more complex nor larger;
4. If multiple register sets are used, it is not necessary to reserve a set for nonusing programs;
5. The protection mechanism is controlled by the control program and does not affect the development of compilers and assemblers;
6. The protection mechanism is in effect at run time and thereby is effective for computed addresses and "computed instructions" as in (execute);
7. No continuous performance degradation is experienced for the protection mechanism;
8. Program checks can be initiated to assist in debug of offending programs.

Figure 3A:
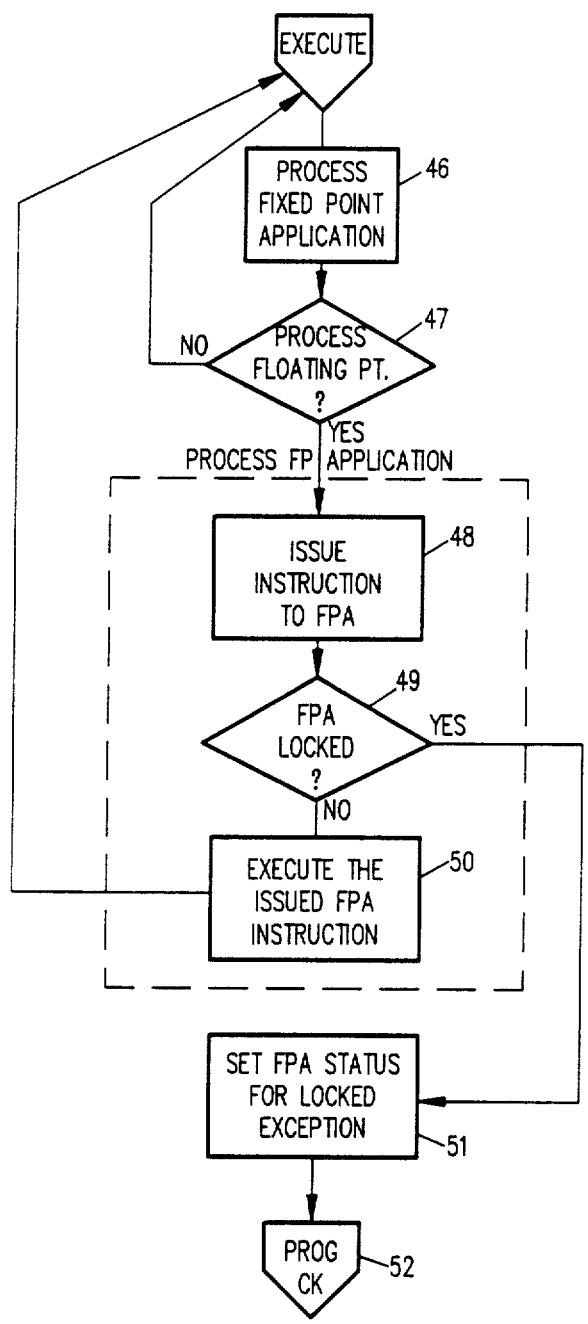
FIGS. 3A and 3B are flow charts illustrating the operation of the present invention.

Referring to FIG. 3A, if, during the execution of an application program, the application involves processing of a fixed point application process, represented by block 46, the system will proceed to execute this program. If the application involves processing a floating point operation represented by box 47, the system proceeds to issue instructions to the FPA, represented by block 48. The system then determines whether the FPA is locked, as shown in block 49. If the FPA is not locked, as would be the case for the execution of initial task A, the system proceeds to begin the execution of the task A FPA instruction, as represented by block 50.

With a positive indication that the FPA is locked, such as would occur after interruption of task A by task B when task A was utilizing the FPA and task B required the use of the FPA, as in the example described above in connection with FIG. 2, the system sets the FPA status for lock exception, represented by block 51, causing the generation of a program check exception, represented by block 52.

Figure 3B:
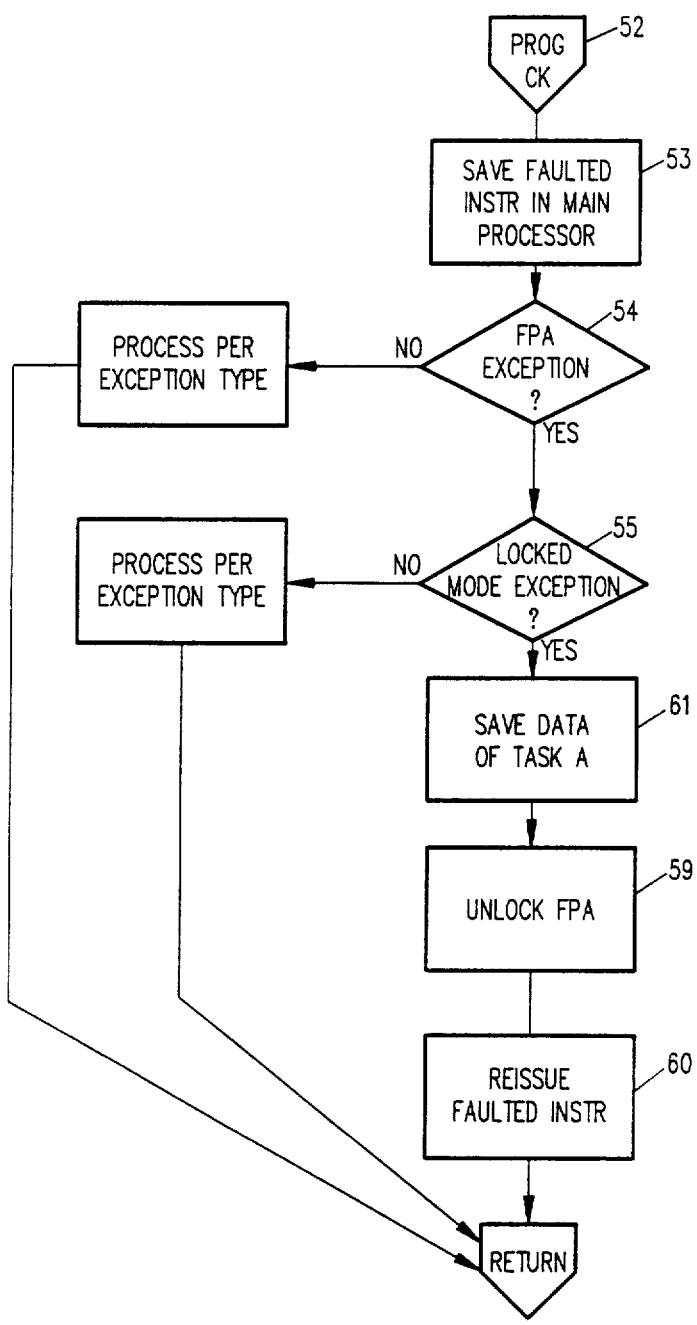

Referring to FIG. 3B, program check 52 and the resulting interrupt results in the system saving the faulted instruction of task B in the main processor, represented by block 53. The system then examines the fault exception to determine if it was the result of a process program seeking access to the FPA, represented by block 54. If the answer to this is yes, the system then examines whether the FPA exception was caused by a lock condition in the FPA, represented by block 55.

If it was so caused, the system, as represented by block 61, then stores the FPA information of the interrupted task A presently therein. The system then unlocks the FPA (block 59) and reissues the faulted instruction (block 60) which had been saved in the main processor (block 53).

I claim:

1. In a data processing system operating in a multiprogramming mode in which a plurality of different tasks are performed, at least one of said tasks being interruptable by another one of said tasks, said system including at least one facility which is not used by all of said tasks, the method of operating said system comprising
   permitting access to said facility by a first task requesting such access;
   locking said facility after access thereto by said first task requesting access thereto to prevent further access to said facility by subsequent tasks;
   examining a subsequent task which interrupts said first task to determine whether said subsequent task requires access to said facility;
   executing said subsequent task if it does not require access to said facility, while maintaining said facility locked with the information relative to said first task stored therein;
   storing said information present in said facility relative to said first task externally of said facility if said interrupting subsequent task requires access to said facility;
   unlocking access to said facility; and
   permitting access to said facility by said interrupting subsequent task.

2. A method in accordance with claim 1 including the step of restoring access by said first task to said facility after completion of said interrupting subsequent task.

3. A method in accordance with claim 2 including the steps of restoring access by said first task to said facility after completion of said access to said facility by a second task and;
   restoring to said facility said information relative to said interrupted first task.

4. A method in accordance with claim 2, said system employing privileged and nonprivileged commands, comprising the steps of
   generating a first privileged command to lock said facility to prevent access to said facility; and
   denying access to said facility to any nonprivileged command until said facility is unlocked.

5. A method in accordance with claim 4 including the step of
   generating a second privileged command to cause said storing of said information present in said facility relative to said first task prior to permitting access to said facility by a second task.

6. A date processing system operating in a multiprogramming mode in which a plurality of different tasks are performed, at least one of said tasks being interruptable by another one of said tasks, said system including at least one facility which is not used by all of said tasks, said system including
   means for permitting access to said facility by a first task requesting such access;
   means for locking said facility after access thereto by said first task requesting access thereto to prevent further access to said facility by subsequent tasks;
   means for examining a subsequent task which interrupts said first task to determine whether said subsequent task requires access to said facility;
   means for executing said subsequent task if it does not require access to said facility, while maintaining said facility locked with the information relative to said first task stored therein;
   means for storing said information present in said facility relative to said first task externally of said facility if said interrupting subsequent task requires access to said facility;
   means for unlocking access to said facility; and
   means for permitting access to said facility by said interrupting subsequent task.

7. A system in accordance with claim 6 including:
   means for restoring access by said first task to said facility after completion of said access to said facility by one of the subsequent tasks and;
   means for restoring to said facility said information relative to said interrupted first task.

8. A system in accordance with claim 6, said system employing privileged and nonprivileged commands, including:
   means for generating a first privileged command to prevent access to said facility; and
   means for denying access to said facility to any nonprivileged command.

9. A system in accordance with claim 8 including:
   means for generating a second privileged command to cause said storing of said information in said facility relative to said first task prior to permitting access to said facility by one of the subsequent tasks.

* * * * *

UNITED STATES PATENT AND TRADEMARK OFFICE
CERTIFICATE OF CORRECTION

PATENT NO. : 4,794,515
DATED : December 27, 1988
INVENTOR(S) : Louis M. Hornung

It is certified that error appears in the above-identified patent and that said Letters Patent is hereby corrected as shown below:

Col. 3, line 52, "flip flop 9" should read --flip flop 29--.

Signed and Sealed this

Nineteenth Day of December, 1989

Attest:

JEFFREY M. SAMUELS

Attesting Officer     Acting Commissioner of Patents and Trademarks